United States Patent [19]

Swartzendruber et al.

[11] Patent Number: 4,844,173
[45] Date of Patent: Jul. 4, 1989

[54] METHOD OF ASSEMBLING A DISK

[75] Inventors: James A. Swartzendruber, West Bend, Wis.; Warren L. Thompson, Ankeny; Donald R. Peck, Clive, both of Iowa

[73] Assignee: Deere & Company, Moline, Ill.

[21] Appl. No.: 210,679

[22] Filed: Jun. 23, 1988

[51] Int. Cl.⁴ ............... A01B 21/08; A01B 23/04
[52] U.S. Cl. .................. 172/595; 172/311; 172/776; 172/1
[58] Field of Search ........... 172/594, 595, 596, 311, 172/456, 580, 413, 1, 776; 29/148.3

[56] References Cited

U.S. PATENT DOCUMENTS

| | | | |
|---|---|---|---|
| 3,730,280 | 5/1973 | Oelschlaeger | 172/594 |
| 3,830,313 | 8/1974 | Frager | 172/311 |
| 3,896,882 | 7/1975 | Frank | 172/311 |
| 3,944,001 | 3/1976 | Warner | 172/311 |
| 4,180,135 | 12/1979 | Birkenbach | 172/407 |
| 4,300,640 | 11/1981 | Baxter | 172/311 |
| 4,492,272 | 1/1985 | Jensen | 172/178 |

FOREIGN PATENT DOCUMENTS 192917  9/1986  European Pat. Off. ............ 172/595

Primary Examiner—Richard J. Johnson

[57] ABSTRACT

A simplified method of assembling a disk from the ground up by first assembling disk gangs and then connecting the disk gangs together to provide a self-standing front and rear main disk gang pairs. The main frame is assembled over main disk gang pairs after which wheel modules are attached. Disks of different sizes are assembled, utilizing generally identical main frame beams with the same connecting locations, by decreasing the distance between the forward and rear gang pairs and moving the main frame beams outwardly as the desired width of the disk increases.

25 Claims, 3 Drawing Sheets

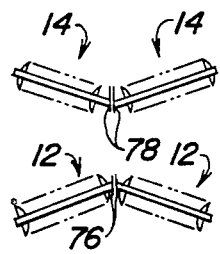
FIG. 3a
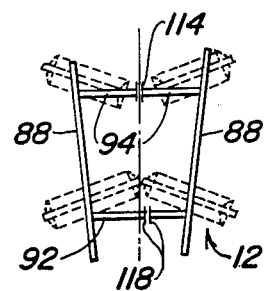
FIG. 3b
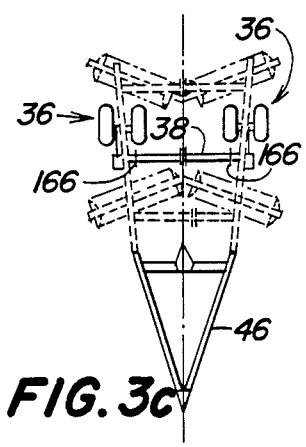
FIG. 3c
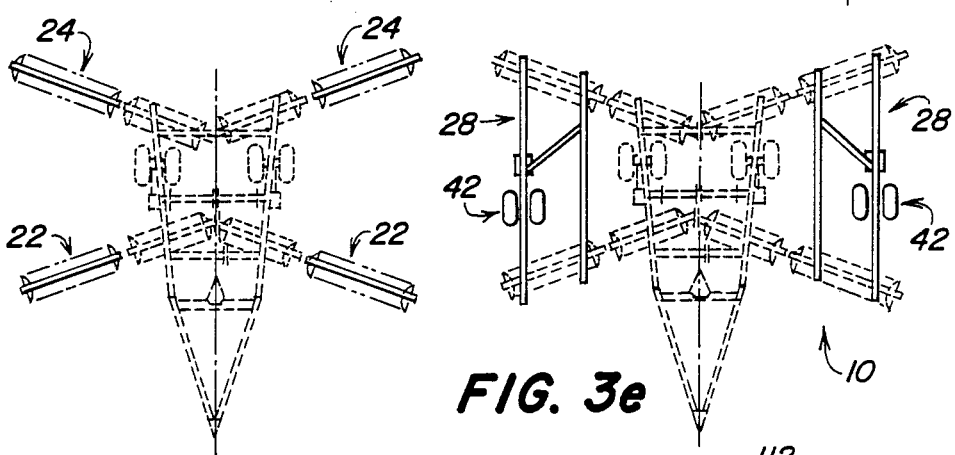
FIG. 3d
FIG. 3e
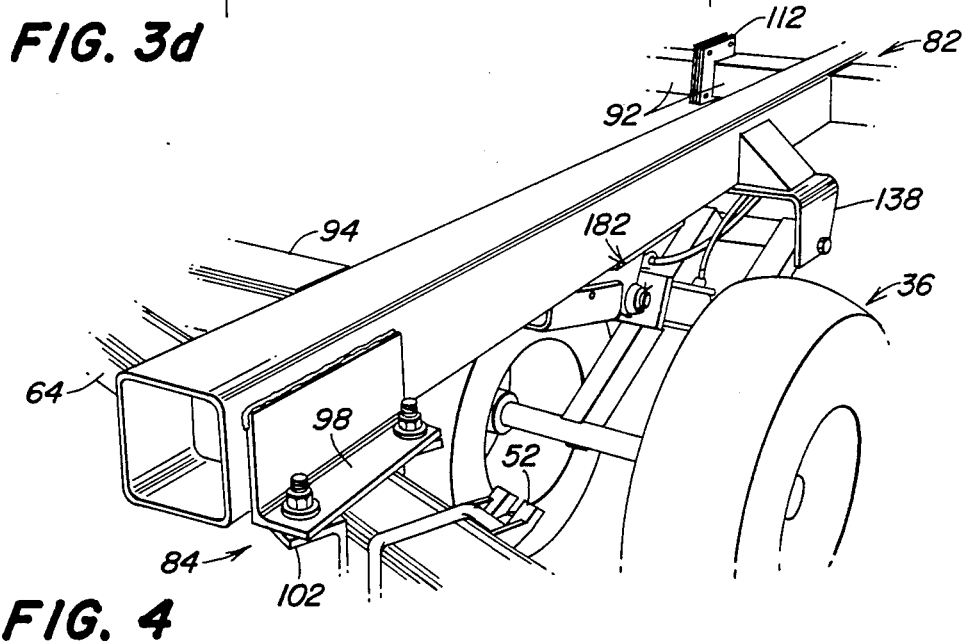
FIG. 4

METHOD OF ASSEMBLING A DISK

BACKGROUND OF THE INVENTION (1) Field of the Invention

The present invention relates generally to agricultural implements such as disks, and more specifically, to a method of manufacturing disks of various sizes utilizing common structural members.

(2) Related Art

Agricultural implements such as disks typically use a plurality of different frames to provide for disk widths ranging from approximately eighteen to thirty-five feet. The multiple frames provide proportionality of width between the center and wing sections on multi-section wing fold disks and have been necessary to provide strength adequate to carry the disk in transport. Because of the gang angle associated with the disks, wider frame sections require longer fore-and-aft frame members so that different weld fixtures have to be used for each frame size. The number of common parts which may be utilized is significantly reduced. As a result, manufacturing time and costs are increased. Attempts to increase commonality of parts can result in changes in the geometric relationships between the gauge wheels and the disk blades, as well as other structural problems, which have hindered the development of a method for manufacturing a reduced cost disk.

Previous methods of assembling a disk included assembling a frame, generally in a box or rectangular configuration, and then utilizing a lift to raise the frame so that gang tubes could be slid under the frame. Often the method involved forming attaching holes in the underside of the frame and making the necessary connections while the frame was hoisted on the lift. Such a method required inconvenient and time-consuming work under the frame.

BRIEF SUMMARY OF THE INVENTION

It is therefore an object of the present invention to provide an improved method for manufacturing an implement such as a disk. It is a further object to provide such a method which reduces the cost to manufacture such a disk.

It is a another object of the present invention to provide an improved method for manufacturing a disk or similar implement wherein various sizes of the implement may be manufactured utilizing an increased number of common or substantially similar parts while reducing a number of fixtures necessary to manufacture the disk. It is a further object to provide such a method wherein the geometric relationships between the gang wheels and the disk blades remain generally constant for the different sizes of disks. It is still a further object to provide such a method which reduces the time and cost of manufacturing a disk while maintaining adequate disk frame strength.

It is a further object to provide a simplified method for manufacturing a disk or similar implement wherein the implement is assembled from the ground up. It is another object to provide such a method which reduces the time that the disk frame must be hoisted by a lift as well as the time an assembler must spend making connections at the underside of the disk.

It is still a further object to provide such a method wherein the disk gangs are assembled and connected together at their centers to from self-standing gang pairs and thereafter the main frame is lowered onto and assembled on the gang pairs.

In accordance with the above objects, a method of manufacturing a disk includes the steps of bolting gang tubes together at the center line of the disk with the desired gang angles and thereafter laying first and second main frame beams over the gang tubes. The first and second main frame beams are of generally common configuration, regardless of the desired disk frame size, and include connecting brackets spaced a preselected fore-and-aft distance apart and identically located wheel mounting brackets. By decreasing the distance between the front and rear gang tubes as the desired frame width is increased, the generally common main frame beams can be used while the geometric relationships between the gauge wheels and the disk blades remain constant. For wider frames, wider hitch and connecting link members are combined with the common fore-and-aft members. Since common fore-and-aft members are utilized for all frame sizes, fewer parts are needed and fewer fixtures are needed to assemble the parts resulting in a reduced cost method of manufacturing a disk or similar implement. The arrangement of the main fore-and-aft members over the connected gang tubes with the fore-and-aft members diverging outwardly in the rearward direction provides adequate frame strength for even the largest disk and provides more structural stability than a box frame or other rectangular arrangement which has heretofore been commonly used when manufacturing disks.

According to another aspect of the present invention, the gang tubes are connected at their centers to form two pairs of self-standing disk gangs. The main frame beams are then lowered onto the gang tubes and bolted loosely thereto. Transversely extending connecting links projecting inwardly from the beams are aligned and connected. Thereafter all of the joints beginning at the center of the disk and extending outwardly are tightened. Wheel modules are then connected to the main frame. After wing gangs are attached to the gang tubes, wing frames are lowered on top of the wing gangs and bolted thereto, and wheel modules are connected to the wing frames. In this manner, the disk is essentially built from the ground up to reduce the time the disk frame must be lifted by a hoist and to reduce the amount of time workers have to spend under the frame to make the necessary connections. The present method can reduce the amount of time necessary to assemble a disk to approximately half that required by previous methods of assembly.

These and other objects, features and advantages of the present invention will become apparent to those skilled in the art from the description which follows and from the drawings.

BRIEF DESCRIPTION OF THE DRAWINGS

FIGS. 3a–3e are schematic representations of steps utilized in constructing a disk according to the present invention.

FIG. 4 is a perspective view of a portion of a disk constructed in accordance with the teachings of the present invention and showing main frame and wheel module connecting brackets.

DESCRIPTION OF THE PREFERRED EMBODIMENT

Figure 1:
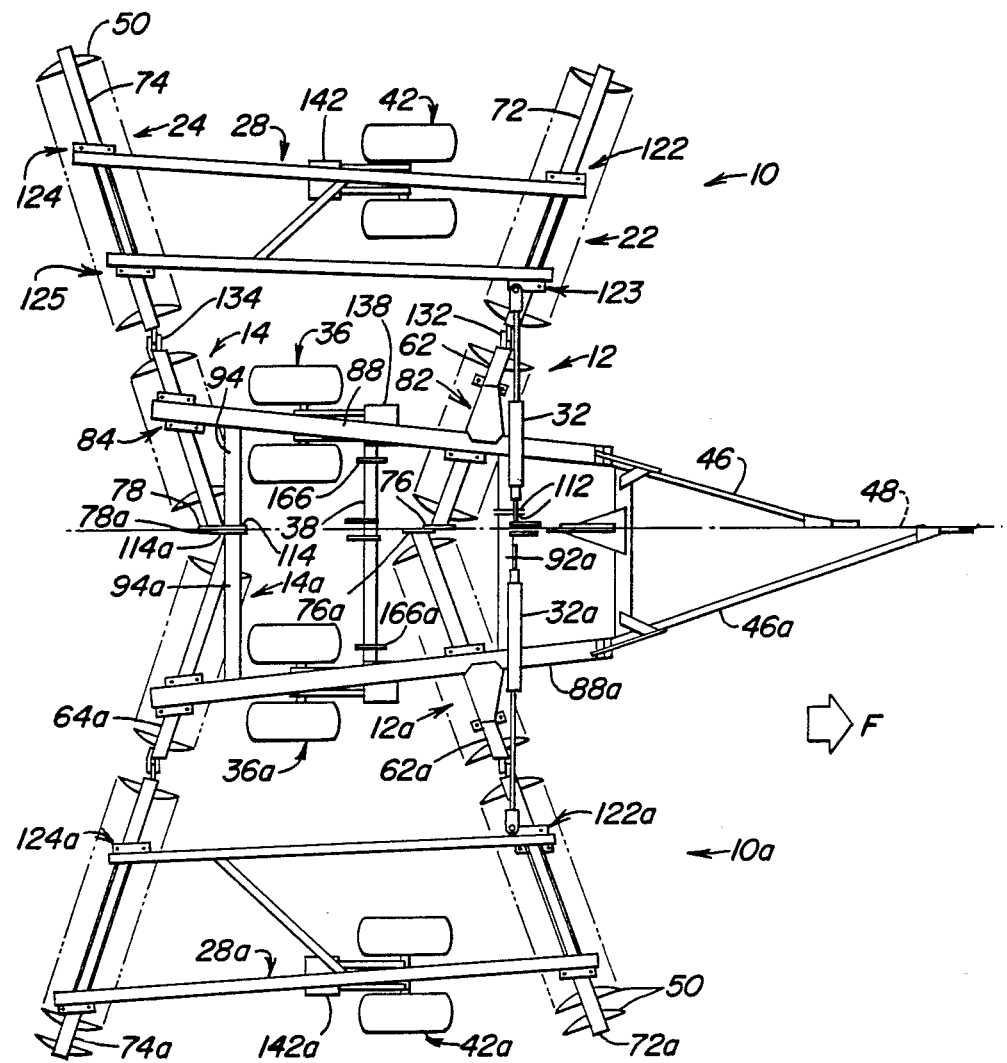
FIG. 1 is a plan view of halves of two disks of different sizes split at their center lines and showing the decrease in spacing between the front and rear gangs of the larger disk to accommodate fore-and-aft extending main frame beams of generally identical construction.

Referring to FIG. 1, therein is shown opposite half portions of two disks, the smaller one indicated generally at 10 and a similar but larger one indicated at 10a. Only the smaller disk 10 will be described in detail here, with the corresponding parts on the larger disk 10a having a like designation but with a suffix "a" added thereto. The disk 10 includes front and rear disk gangs 12 and 14, respectively, connected to a main frame 18. Front and rear wing gangs 22 and 24 are pivotally connected to the corresponding gangs 12 and 14. The wing gangs 22 and 24 are connected to wing frames 28, and hydraulic folding cylinders 32 are connected between the main frame 18 and the wing frames 28 for rocking the wings between a lowered field-working position and a raised transport position. Wheel modules 36 are connected to the main frame and are rockable vertically by conventional hydraulic structure (FIG. 4) to raise and lower the disk 10. The pair of wheel modules 36 on the main frame are connected by transversely extending rockshaft structure 38. Wheel modules 42 are connected to the wing frames 28. Hitch structure 46 is connected to the forward end of the main frame 18 for towing the disk 10 in the forward direction (F) over the ground. It is to be understood that the construction of the disks 10 and 10a is such that the half of the disk on one side of the center line, indicated generally at 48 in FIG. 1, is generally the mirror image of the half on the opposite side of the center line.

The disk gangs 12 and 14 include conventional axle-mounted disks 50 supported from disk bearing standards 52 which in turn are connected to gang frames or tubes 62 and 64, respectively. Similarly, the wing gangs 22 and 24 include disks 50 connected by standards 52 to gang frames or tubes 72 and 74, respectively. The gang tubes are generally rectangular in cross section and extend parallel to the axis of rotation of the corresponding disks 50. The inner ends of the tubes 62 and 64 are connected by tube brackets 76 and 78, respectively. The main gang tubes 62 and 64 are fixed to the main frame 18 by brackets indicated generally at 82 and 84, respectively. The main frame 18 includes a pair of fore-and-aft extending main frame beams 88 which are joined by forward and aft connecting links 92 and 94 which extend transversely between the beams 88. The beams 88 diverge outwardly in the rearward direction. The brackets 82 and 84 include upper flanged portions, indicated at 98 in FIG. 4, which are welded at preselected locations near the front and the rear of the beams 88. Lower flanged portions 102 are fixed to the corresponding gang frame tubes 62 and 64 to mate with the upper flanged portions 98, and both the flanged portions are apertured to receive connecting bolts 104 therethrough. The connecting links 92 and 94 include link brackets 112 and 114 which, as will be described in detail below, are connected at or near the center line 48 during assembly of the disk 10.

The wing frames 28 include flanged brackets 122 and 123 connecting the forward wing gang tube 72 to the forward portion of the frame, and rear flanged brackets 124 and 125 connecting the aft end of the frame 28 to the aft wing frame tube 74. Forward and aft pivot structures 132 and 134 are fixed to the outer ends of the gang frame tubes 62 and 64, respectively, and to the inner ends of the tubes 72 and 74, respectively, so that as the cylinders 32 are retracted the wing gangs 22 and 24 will be pivoted about a generally fore-and-aft extending axis.

The wheel modules 36 are connected by downwardly opening, hat-shaped brackets 138 connected near the central portion of the beam 88. The wing frame wheel modules 42 are connected to the wing frames by similar wheel module brackets 142 generally centrally located between the brackets 122 and 124.

Assembly of the Disk

Figure 2:
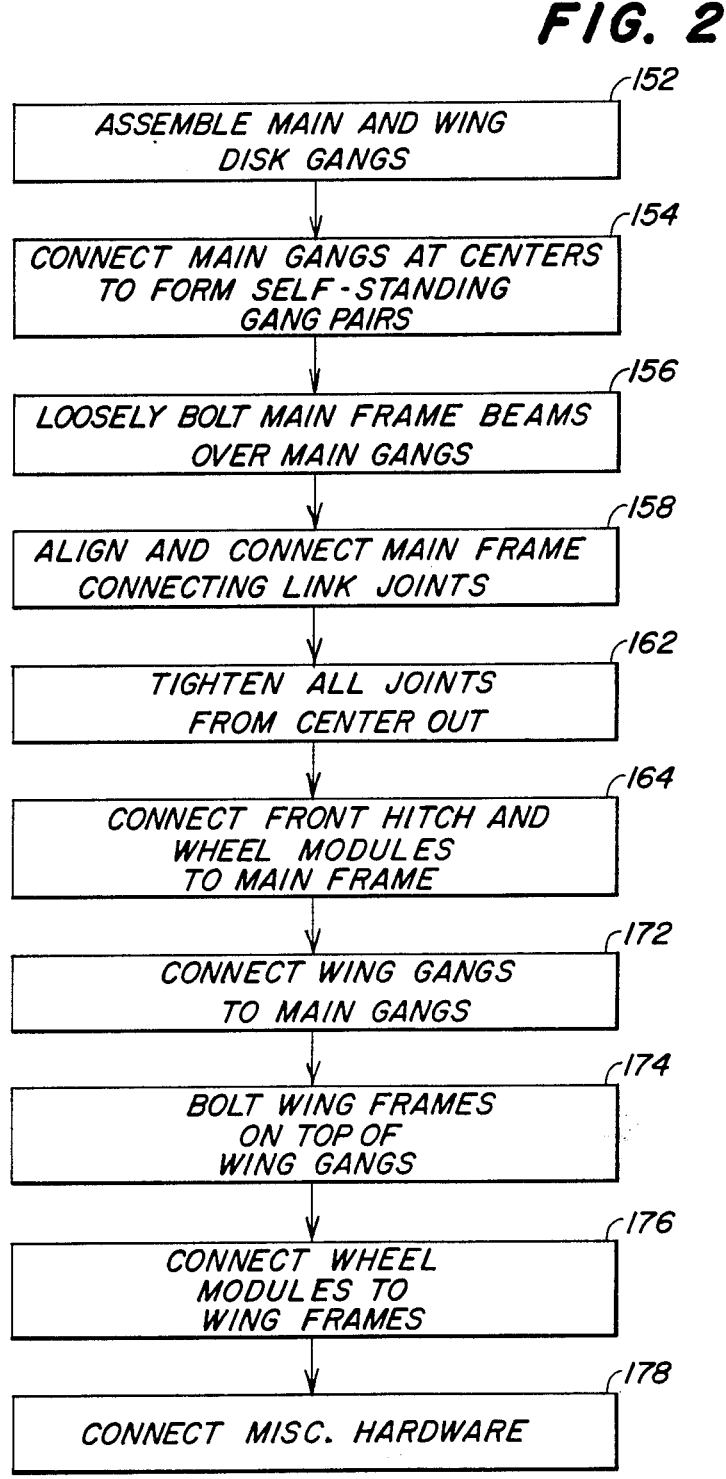
FIG. 2 is a flow chart generally outlining the steps of manufacturing a disk according to the present invention.

Referring now to FIGS. 2 and 3, the procedure for assembling a disk will be discussed in detail. As shown generally at 152 in FIG. 2, the front and rear disk gangs 12 and 14 and the front and rear wing gangs 22 and 24 are first assembled by connecting the disk-bearing standards 52 to the disks 50 and to the corresponding gang tubes 62, 64 and 72, 74. Thereafter, as shown at 154, the main disk gangs 12 and 14 are connected together at their innermost ends by bolting the brackets 76 on the forward gangs 12 together and bolting the brackets 78 on the rearward gangs 14 together. As can be seen in FIGS. 1 and 3, the brackets 76 and 78 are fixed to the corresponding gang tubes 62 and 64 such that when the brackets are bolted together, the gangs diverge in the fore-and-aft direction from the center line 48 outwardly to provide the desired gang angles. The connected disk gangs 12 and 14 are self-standing and are placed on the floor or other supporting structure in generally the configuration they will assume in the finally assembled disk 10 (see FIG. 3a) with the gang tubes 62 and 64 located above the disks 50.

Each main frame beam 88 with its corresponding brackets 82, 84 and 138, as well as the inwardly directed connecting link portions 92 and 94, are fabricated in a weld fixture. The locations of the brackets 82, 84 and 138 and link portions 92 and 94 are fixed, regardless of the disk size so that the same fixtures may be utilized for any size disk.

The individual weldments including the respective main frame beams 88 with brackets and link portions are then lowered onto the self-standing disk gang pairs so that the flanges 98, 102 on the brackets 82 and 84 generally align. As shown at 156, the main frame beams 88 are loosely connected over the main gangs 12 and 14 by inserting the bolts 104 through the aligned apertures in the flanges. Prior to this time the central main frame joints defined by the front and rear link brackets 112 and 114 are disconnected to facilitate the placement of the weldments on the gang pairs and loose alignment of the main frame brackets 82 and 84. Thereafter, as indicated at 158 in FIG. 2, the brackets 112 and 114 are aligned and bolts are inserted through the brackets to rigidly secure the links 92 and 94 and thus the main frame beams 88 together. Preferably, as shown at 162, the joints are tightened from the center out beginning at the link brackets 112 and 114. The apertures in the brackets 82 and 84 are slightly oversized to facilitate assembly and accommodate manufacturing tolerances. After the link brackets 112 and 114 are secured, the bolts in the brackets 82 and 84 are tightened to provide a rigid center disk structure. In the larger disk 10a, the rear link brackets 114a are bolted to the center tube brackets 78a for increased strength.

The front hitch structure 46 is then connected to the forward ends of the beams 88 as indicated at 164 and in FIG. 2 and at FIG. 3c. Also, as shown at FIG. 3c, the main frame wheel modules 36 are pivotally connected to the downwardly opening module brackets 138 on each of the beams 88. As can be appreciated from FIG. 1, the same bracket locations are utilized on the beam 88a for the larger disk 10a as on the beam 88 for the smaller disk 10. For the larger disk 10a, the front and rear disk gangs 12a and 14a are moved more closely together at the center line 48 so that the beam 88a may be moved outwardly farther on the gang tubes 62a and 64a. The connecting links 92a and 94a are also lengthened to accommodate the wider spacing between the beams 88a. A larger hitch structure 46a is also utilized.

The rockshaft structure 38 is connected between the wheel modules 36 for constraining the modules to operate in unison. Brackets 166 connect the rockshaft structure to the wheel modules 36 and shims are provided for inserting between the brackets 166 to facilitate assembly and accommodate manufacturing tolerances in the main disk assembly.

After the main frame portion of the disk 10 is assembled, the wing gangs 22 and 24 are pivotally connected at their inner ends to the outermost ends of the corresponding main frame disk gangs 12 and 14 by the pivot structures 132 and 134, 15 respectively (see 172 of FIG. 2 and FIG. 3d). At this point of the process, the wing frames 28 are not yet attached to the wing gangs 22 and 24 so that each of the gangs can be conveniently moved into position. Once the wing gangs 22 and 24 have been connected to the respective main disk gangs 12 and 14, the wing frames 28 are lowered onto the wing gangs 22 and 24, and the flanges on the brackets 122, 123 and 124, 125 are aligned and secured together rigidly by bolts (see 174 of FIG. 2). Once the wing frames 28 are secured in position on the wing gangs 22 and 24, the wing gang wheel modules 42 are connected to the wing frame brackets 142 (see FIG. 3e and 176 of FIG. 2). Thereafter, miscellaneous hardware is connected to the disk 10 to provide the completed implement 178. The folding cylinders 22 are attached, as well as the hydraulic lift circuit indicated generally at 182 in FIG. 4. Hitch leveling structure and other components are also added to the disk 10.

Having described the preferred embodiment, it will be apparent that modifications can be made without departing from the scope of the invention as defined in the accompanying claims.

We claim:

1. A method of assembling a disk of preselected configuration, said disk adapted for towing in the forward direction, comprising:
   providing a plurality of disc gang frames, each gang frame comprising a plurality of discs and a gang tube;
   connecting first and second gang frames together to form a first self-standing gang frame pair having a first gang frame angle;
   connecting third and fourth gang frames together to form a second self-standing gang frame pair having a second gang frame angle;
   placing the gang frame pairs in fore-and aft spaced relation to each other generally in the positions the pairs will assume in the assembled configuration;
   placing a main frame on the gang frame pairs; and
   fixing the main frame to the gang frames in the preselected configuration with the gang frame pairs fixed in their respective gang frame angles and providing transverse stability to the main frame.

2. The method as set forth in claim 1 wherein the step of placing the main frame includes individually placing first and second fore-and-aft extending main frame beams over the first and third, and second and fourth, gang frames, respectively; and wherein the step of fixing the main frame includes connecting the main frame beams to the respective gang frames.

3. The method as set forth in claim 2 further including the steps of providing transversely extending link structure on the main frame beams and connecting the main frame beams together via the link structure.

4. The method as set forth in claim 1 further including: connecting front and rear brackets to the main frame beams; connecting mating bracket structure to the gang frames, wherein the step of fixing the main frame includes connecting the brackets to the mating bracket structure.

5. The method as set forth in claim 4 including the further steps of: selecting gang frame width dependent upon the desired size of the disk; wherein the step of placing the gang frame pairs includes spacing the gang frame pairs at one of a plurality of preselected locations dependent on the desired size of the disk; wherein the step of connecting front and rear brackets includes connecting the brackets at the same locations on the main frame beams regardless of the desired size of the disk; and wherein the step of placing the main frame includes transversely spacing the main frame beams according to the preselected gang frame pair locations so that generally identical main frame beams may be used for assembling disks of different sizes.

6. The method as set forth in claim 1 further including, prior to the step of placing the gang frame pairs, mounting disk blade assemblies on the gang frames and, after the step of fixing the main frame, connecting wheel modules to the main frame while supporting the main frame on the disk blade assemblies.

7. The method as set forth in claim 1 further including: providing wing gangs, pivotally connecting the wing gangs directly to the gang frame pairs, and after the step of pivotally connecting the wing gangs, connecting frame structure to the wing gangs.

8. A method of assembling a disk of preselected configuration, said disk adapted for towing in the forward direction, comprising:
   providing a plurality of disc gang frames, each gang frame comprising a plurality of discs and a gang tube;
   connecting first and second gang frames together to form a first self-standing gang frame pair;
   connecting third and fourth gang frames together to form a second self-standing gang frame pair;
   placing the gang frame pairs in fore-and aft spaced relation to each other generally in the positions the pairs will assume in the assembled configuration;
   placing a main frame on the gang frame pairs;
   fixing the main frame to the gang frames in the preselected configuration;
   providing wing gangs;
   connecting the wing gangs tot he gang frame pairs;
   after the step of connecting the wing gangs, connecting frame structure to the wing gangs; and
   wherein the step of connecting frame structure includes attaching fore-and-aft wing frame beams to the top of the wing gangs.

9. The method as set forth in claim 8 including, after the step of attaching, connecting wheel modules to the wing frame beams.

10. The method as set forth in claim 3 wherein the step of fixing the main frame to the gang frames further includes loosely connecting the main frame beams to the gang frames prior to the step of connecting the main frame beams together, and firmly securing the main frame beams to the gang frames after the step of connecting the main frame beams together.

11. A method of manufacturing disks of varying widths utilizing generally identical main frame sections, said method comprising the steps of:
providing pairs of disk supporting forward and rear gang tubes, each tube of preselected length with innermost and outermost ends, and connecting the respective gang tube pairs at their innermost ends generally at the fore-and-aft center line of the disk at preselected gang tube angles;
providing a pair of generally fore-and-aft extending main frame beams, each beam having forward and aft connecting structure fixed to preselected locations on the beam;
fixing the spacing between the gang tubes, said step of fixing including attaching the forward and rear gang tubes to the beams with the connecting structure;
wherein the step of providing the gang tubes includes selecting the length of the tubes in accordance with the desired width of the disk, the step of providing the main frame beams includes providing the beams with the same lengths and the same preselected connecting structure locations regardless of the desired disk width, and the step of fixing the spacing between the gang tubes includes decreasing the spacing between the forward and rear gang tubes at the center line and moving the main frame beams outwardly as the desired width of the disk increases.

12. The method as set forth in claim 11 including the steps of providing a front connecting link structure of predetermined length and connecting the link structure between the main frame beams forwardly of the front gang tubes.

13. The method as set forth in claim 11 including after the step of attaching the gang tubes attaching wheel modules to the main frame beams.

14. The method as set forth in claim 13 wherein the step of providing main frame beams includes providing pivot structures at preselected locations on the main frame beams and wherein the step of attaching wheel modules includes pivotally connecting wheel structure to the pivot structure.

15. The method as set forth in claim 13 wherein the step of attaching wheel modules occurs after the step of fixing the spacing.

16. The method as set forth in claim 12 wherein the step of attaching the forward and rear gang tubes includes loosely bolting the gang tubes to the beams prior to the step of connecting the link structure, and tightening the loosely bolted gang tube to beam connections after the step of connecting the link structure.

17. The method as set forth in claim 12 further including the step of providing rear transversely extending link structure on the beams and connecting the rear link structure to the connection of the rear gang tubes.

18. The method as set forth in claim 11 including the step of providing pairs of self-standing gang frames prior to the step of fixing the gang tube spacing, said step of providing pairs including: attaching disks to the gang tubes prior to the step of connecting the gang tubes at their innermost ends.

19. The method as set forth in claim 18 including the steps of pivotally attaching wing gangs directly to the gang frames and attaching wing frames to the wing gangs after attaching the gang tubes to the beams.

20. A method of assembling a disk on a work surface comprising:
assembling disk gangs, said step of assembling including connecting disk blade assemblies to individual gang frame tubes;
supporting the disk gangs on the work surface by the disk blade assemblies in generally the configuration the gangs will assume in the fully assembled disk;
after the step of supporting, lowering a main frame including at least two transversely spaced main frame beams unto the gang frame tubes;
loosely connecting the lowered main frame to the gang frame tube;
after connecting the lowered main frame to the gang frame tube;
after the step of loosely connecting, fixing the main frame beams to each other;
maintaining the disk gangs in a preselected fixed configuration including, after the step of fixing the main frame beams to each other, tightening the loose connections between the main frame and the gang frame tubes; and
attaching wheel modules to the main frame.

21. The method as set forth in claim 20 further including the step of pivotally attaching wing disk gangs to the disk gangs supported on the work surface and, after the step of attaching the wing disk gangs, lowering wing disk gang frames unto the wing disk gangs.

22. The method as set forth in claim 21 including, after the step of lowering the wing disk gang frames, attaching wheel modules to the wing disk gang frames.

23. The method as set forth in claim 20 including, prior to the step of lowering a main frame, assembling first and second weldments by attaching links at preselected locations on the respective main frame beams, wherein the step of fixing the main frame beams to each other includes connecting the links together.

24. The method as set forth in claim 20 including, before the step of lowering a main frame, connecting wheel brackets to the main frame, said step of attaching wheel modules including attaching the modules to the wheel brackets after the step of lowering.

25. The method as set forth in claim 20, including connecting gang frame tubes together prior to lowering a main frame.

* * * * *

UNITED STATES PATENT AND TRADEMARK OFFICE
CERTIFICATE OF CORRECTION

PATENT NO. : 4,844,173

DATED : 4 July 1989

INVENTOR(S) : James A. Swartzendruber et al

It is certified that error appears in the above-identified patent and that said Letters Patent is hereby corrected as shown below:

Column 6, line 60, change "tot he" to -- to the --.

Column 7, line 43, after "including", insert a comma -- , --; and line 44, after "tubes" insert a comma -- , --.

Column 8, delete lines 28 and 29.

Signed and Sealed this

Twelfth Day of March, 1991

*Attest:*

HARRY F. MANBECK, JR.

*Attesting Officer*  *Commissioner of Patents and Trademarks*